United States Patent [19]
Grinevich et al.

[11] 3,708,698
[45] Jan. 2, 1973

[54] A BISTABLE COUNTING CIRCUIT BASED ON A TRANSISTOR

[75] Inventors: Feodosy Borisovich Grinevich; Vladimir Andreevich Tsyganok, both of Kiev, U.S.S.R.

[73] Assignee: Institut Elektrodi-Namiki Akademii Nauk Ukrainskoi SSR, Kiev, U.S.S.R.

[22] Filed: March 4, 1971

[21] Appl. No.: 120,846

[52] U.S. Cl. ..................307/289, 307/225, 307/289
[51] Int. Cl. ..............................................H03k 3/29
[58] Field of Search.............307/227, 289, 260–262, 307/220–226; 331/107–113

[56] References Cited

UNITED STATES PATENTS 2,873,388 2/1959 Trumbo ..........................307/227 X
3,261,987 7/1966 Chapin ................................307/289
3,348,066 10/1967 Briley ..................................307/289
3,349,252 10/1967 Briley ..............................307/289 X

*Primary Examiner*—Stanley D. Miller, Jr.
*Attorney*—Waters, Roditi, Schwartz & Nissen

[57] ABSTRACT

A pulse technique formed by a device which includes a bistable circuit based on a single transistor which is opened when the circuit is in one state, and closed when it is in the other. In order to provide for the switching of the transistor from one stable state to the other by pulses of one polarity arriving from a common busbar, the present device includes a count input. The present circuit is non-critical to changes in the supply voltages and nominal ratings of the components within a wide range.

1 Claim, 2 Drawing Figures

A BISTABLE COUNTING CIRCUIT BASED ON A TRANSISTOR

The present invention relates to pulse technique, and more specifically to count-input trigger circuits intended for use as counting, storage and other elements in various automatic and remote control devices and computers.

In the prior art, there is a count-input trigger circuit comprising a transistor arranged into a common-emitter configuration and connected to a direct-voltage source, an alternating-voltage source having one of its phases connected to the collector of the transistor, a voltage-doubler rectifier built around two diodes and two capacitors, connected at its input to the collector and emitter, and at its output to the base and emitter of the transistor, and a blocking capacitor placed at the count input of the trigger circuit.

This prior-art trigger circuit is triggered by negative pulses when it uses a P-N-P transistor and by positive pulses when it uses an N-P-N transistor, the trigger pulses being applied to the base of the transistor in both cases. With this relation between the type of transistor and the polarity of trigger pulses, the latter will always, irrespective of the state of the trigger circuit, bias the base-emitter junction of the transistor in the forward direction, so that the trigger-pulse source is actually short-circuited. Because of this, it is necessary to trigger the circuit with rather strong pulses, which cannot be always ensured in practice.

An object of the present invention is to provide a count-input trigger circuit such that when it uses a P-N-P transistor it can be triggered by positive pulses and when it uses an N-P-N transistor it can be triggered by negative pulses.

With this object in view the invention resides in that a count-input trigger circuit has a diode-resistor network whose diode is placed between a blocking capacitor and the base and whose resistor is placed between the same capacitor and the collector of the transistor, and also a second diode placed between an alternating voltage source and the collector of the transistor.

Figure 1:
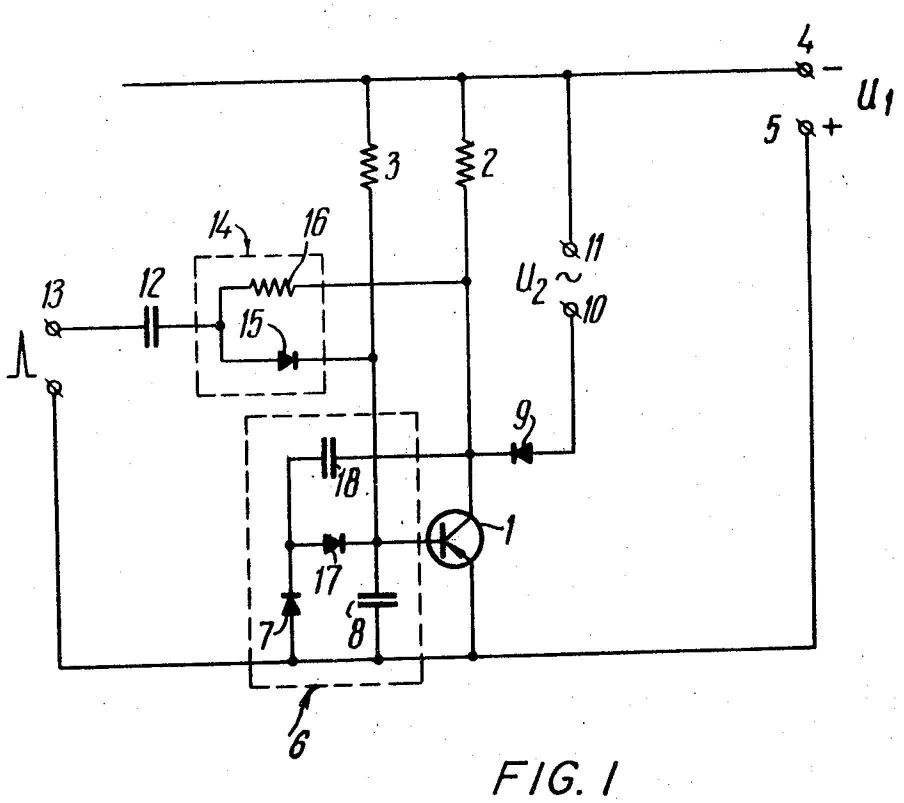
Figure 2:
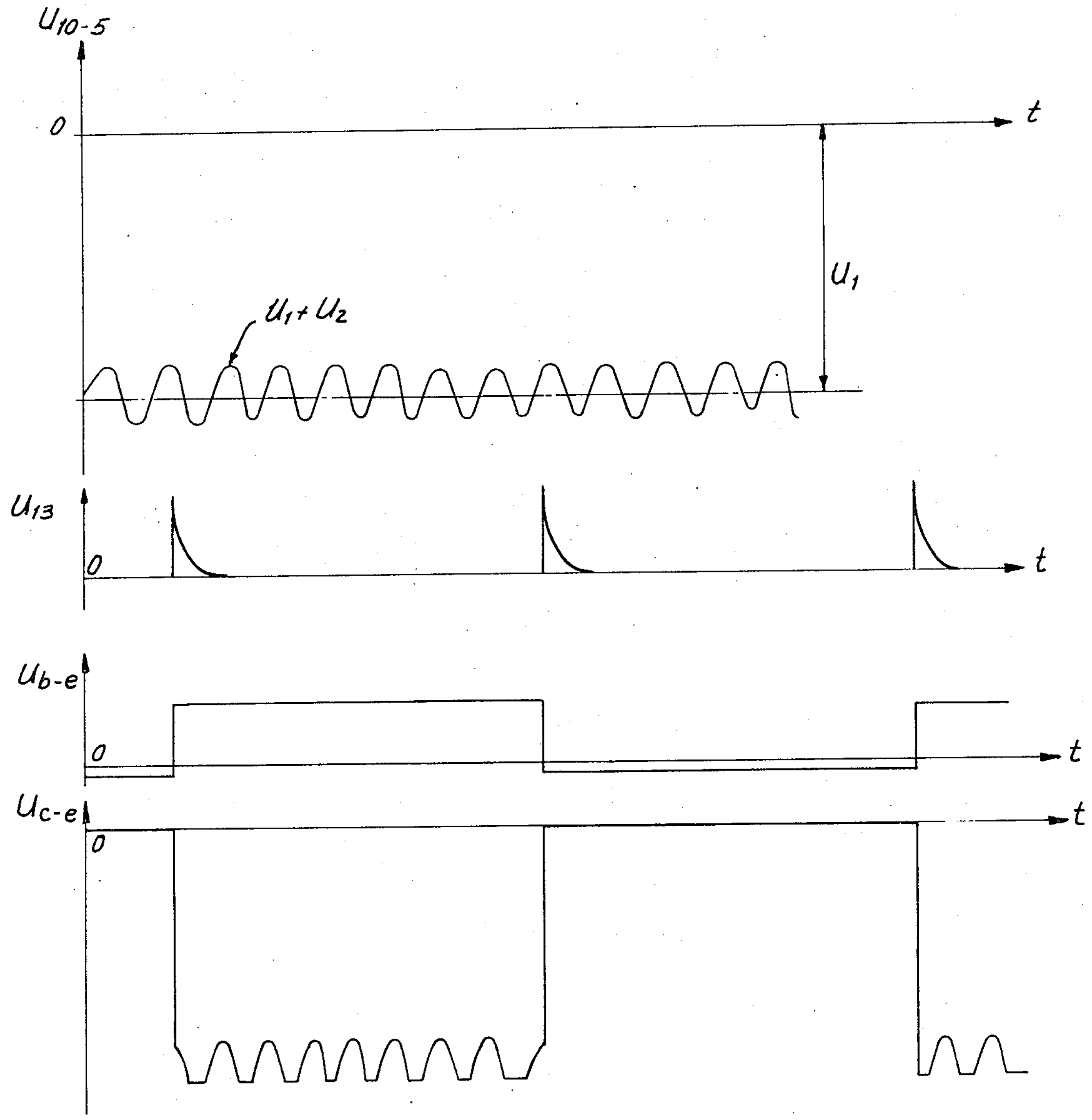

The invention will be more fully understood from the following description of a preferred embodiment when read in connection with the accompanying drawing in which:

FIG. 1 is a schematic circuit diagram of a count-input trigger according to the invention; and FIG. 2 is a waveform diagram with respect to time of the trigger circuit.

Referring to the drawing, there is a trigger circuit which comprises a P-N-P transistor 1 with a load 2 in its collector lead, a resistor 3 placed between the base of the transistor 1 and the negative side of a direct-voltage source $U_1$ (not shown in the drawing) connected to terminals 4 and 5 of the trigger circuit disclosed herein, a voltage-doubler rectifier 6 built around two diodes 7 and 17, and two capacitors 8 and 18, and connected at its input to the collector and emitter of the transistor 1 and at its output to the base and emitter of the transistor 1, a switch diode 9 placed between the collector of the transistor 1 and a terminal 10 of the trigger circuit disclosed herein, to which is connected one of the phases of an alternating-voltage source $U_2$ (not shown in the drawing), while the second phase of the same alternating-voltage source $U_2$ is connected to a terminal II of the trigger circuit disclosed herein, connected to the negative side of the direct-voltage source $U_1$, a blocking capacitor 12 placed at a count input 13 of the trigger circuit, and a diode-resistor network 14 also connected to the blocking capacitor 12, a diode 15 of which is connected to the base of the transistor 1 and a resistor 16 of which is connected to the collector of the transistor 1.

The trigger circuit disclosed herein operates as follows:

If the direct voltage of the source $U_1$ exceeds the amplitude of the alternating voltage from the source $U_2$, the trigger circuit will have two stable states (assuming that the terminals 10 and 11 are coupled resistively).

The first stable state occurs when the transistor 1 is conducting, the switch diode 9 is driven to cut-off, and the alternating-voltage source $U_2$ is disconnected from the collector of the transistor 1. In this case, the transistor 1 is maintained in the conducting state by the current flowing in the resistor 3.

The second stable state takes place when the transistor 1 is cut off, the switch diode 9 transmits the half-waves of alternating current to the load 2, the alternating component of the current flowing in the load 2 is rectified by the rectifier 6 and is applied to the base of the transistor 1 in a polarity ensuring the closed state of the latter.

As shown in FIG. 2 of the drawings, the voltage waveform is as follows:

$U_{10-5}$ is the voltage between the terminals 10 and 5; $U_{13-5}$ the voltage between terminals 13 and 5; $U_{b-e}$ the voltage between the base and the emitter; and $U_{c-e}$ the voltage between the collector and the emitter.

Consider operation of the trigger circuit disclosed herein in counting operation.

Let the transistor 1 be turned OFF. In the case the diode 15 is driven to cut-off by the direct voltage from the source $U_1$. The positive trigger pulse arriving at the count input 13 passes through the resistor 16 to the collector of the transistor 1 and drives the switch diode 9 to cut-off. Since this disconnects the alternating-voltage source $U_2$ from the collector, the disabling bias at the output of the rectifier 6 is removed, and the transistor 1 jumps into conduction under the effect of current flowing through the resistor 3.

A second positive count pulse passes through the conducting diode 15 to the base and also through the resistor 16 to the collector of the transistor 1.

On passing through the resistor 16 to the collector of the transistor 1, the pulse is practically short-circuited by the transistor, without affecting the state of the circuit upon passing through the diode 15, the pulse blocks the emitter-base junction because of which the transistor 1 ceases conducting.

An advantage of the trigger circuit disclosed herein lies in that it can be triggered by pulses of low power, since when the transistor is conducting the input pulse operates only to block the junction, and when the transistor is non-conducting the current taken from the trigger-pulse source is limited by the resistor 16.

Besides, with the alternating-voltage source $U_2$ connected to the collector via the diode 9, the trigger circuit disclosed herein is insensitive to variations in the supply voltages, and the parameters of its components may be chosen within a broad range.

What is claimed is

1. A count-input trigger circuit comprising: a direct-voltage source; a transistor arranged into a common-emitter configuration and connected to said direct-voltage source; an alternating-voltage source connected with one of its phases to the collector of said transistor; a voltage-doubler rectifier connected at its input to the collector and emitter and at its output to the base and emitter of said transistor; a count input comprising an input blocking capacitor; a diode-resistor network whose diode is placed between said blocking capacitor and the base, and the resistor is placed between the same variable-voltage capacitor and the collector of said transistor; a second diode placed between said alternating-voltage source and the collector of said transistor.

* * * * *